United States Patent [19]

Farr

[11] Patent Number: 4,580,849

[45] Date of Patent: Apr. 8, 1986

[54] FLUID-PRESSURE OPERATED BRAKING SYSTEMS FOR VEHICLES

[75] Inventor: Glyn P. R. Farr, Warwickshire, England

[73] Assignee: Lucas Industries Public Limited Company, United Kingdom

[21] Appl. No.: 549,683

[22] Filed: Nov. 7, 1983

[30] Foreign Application Priority Data

Nov. 23, 1982 [GB] United Kingdom ............... 8233385

[51] Int. Cl.⁴ .......................... B60T 8/00; B60T 15/08
[52] U.S. Cl. ..................................... 303/118; 303/119
[58] Field of Search ............... 303/115, 116, 117, 118, 303/68, 6 C; 188/181 A, 181 C, 181 R

[56] References Cited

U.S. PATENT DOCUMENTS

| | | | |
|---|---|---|---|
| 3,950,035 | 4/1976 | Tribe | 303/118 |
| 3,977,734 | 8/1976 | Ronnhult et al. | 303/119 |
| 4,155,603 | 5/1979 | Harries | 303/119 |
| 4,210,370 | 7/1980 | Mortimer | 303/119 |

*Primary Examiner*—Bruce H. Stoner, Jr.
*Assistant Examiner*—Alvin Oberley
*Attorney, Agent, or Firm*—Laff, Whitesel, Conte & Saret

[57] ABSTRACT

In a fluid-pressure operated braking system for vehicles operating fluid from a supply for actuating a wheel brake is supplied to the brake through a skid control unit interposed in the line between the supply and the brake, and a skid responsive device responsive to a skid signal is incorporated for operating a valve assembly to relieve the pressure of the fluid supplied to the brake at a skid point. The unit incorporates a memory chamber for controlling the rate of brake re-application following correction of a skid, and the memory chamber is charged with air only when the skid signal is received. When separate control units are provided for the brakes of wheels at opposite ends of an axle, the memory chambers are interconnected by a pneumatic connection incorporating a restrictor.

15 Claims, 6 Drawing Figures

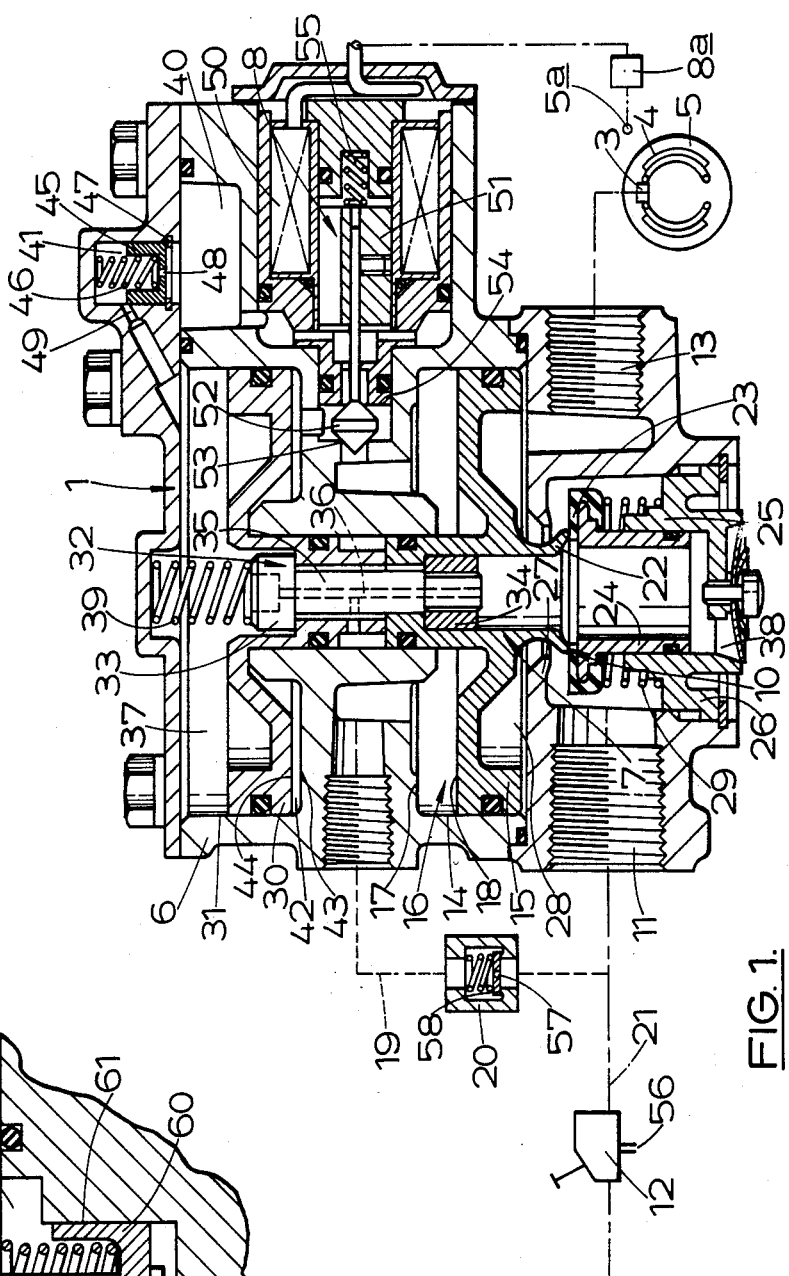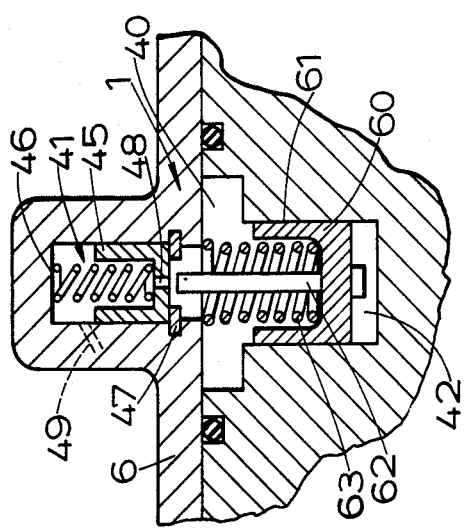
FIG. 1.
FIG. 4

FLUID-PRESSURE OPERATED BRAKING SYSTEMS FOR VEHICLES

SPECIFIC DESCRIPTION

This invention relates to improvements in fluid-pressure operated braking systems for vehicles of the kind in which operating fluid from a supply for actuating a wheel brake is supplied to the brake through a skid control unit interposed in the line between the supply and the brake, and means responsive to a skid signal are incorporated for operating valve means to relieve the pressure of the fluid supplied to the brake at a skid point.

In known systems of the kind set forth, for example as disclosed in GB No. 1 591 166 and GB No. 2 007 787, the skid control unit incorporates a memory chamber for storing a memory pressure dependent upon the brake pressure occurring at the skid point to provide a datum or knee point between first and second stages of brake re-application.

In the systems of GB No. 1 591 166 and GB No. 2 007 787 the memory chamber is charged with air during each and every brake application, irrespective of whether or not a skid signal is present. Since the volume of a memory chamber usually represents between 5% and 10% of the air required to actuate the brake, such wastage of air is significant and must be taken into account when determining the size of an air compressor and air reservoir required for any particular vehicle. In addition, in some systems of this kind, air in the memory chamber does useful work on a control piston which controls operation of a main valve assembly, in turn for controlling the supply of pressure from the supply to the wheel brake. Some known systems such as U.S. Pat. No. 3,950,035 include addition control elements so that the volume of the memory chamber can be reduced but, unfortunately, the minimum volume of the memory chamber is then determined by the minimum restrictor size which will resist icing-up in cold conditions. If a single skid control unit per pair of opposed wheels, known as the wheels per axle, is replaced by two smaller units for individual wheel control, then the total memory volume of that axle will tend to be increased since the frictional losses in the units, and hence the effective areas of the control pistons which are required, do not reduce in proportion to the sizes of the units. The proportion of air wasted is also greater for light brake applications because the memory volume is fixed whilst the full displacement of a brake actuator is only used during maximum brake applications.

According to one aspect of our invention, in a fluid-pressure operated braking system of the kind set forth the skid control unit incorporates a memory chamber for controlling the rate of brake re-application following correction of a skid, and the memory chamber is charged with air only when a skid signal is received.

This conserves air by utilising agent air to determine the rate of brake re-application.

Normally the skid control unit is operated by the supply of a control pressure to an application chamber in order to operate a main valve assembly, in turn for controlling the supply of pressure to a wheel brake, and the memory chamber acts in opposition to the application chamber in order to reduce the control force and determine the position of the knee point during brake re-application following correction of a skid.

Preferably full control pressure is retained in the application chamber throughout the skid cycle. This ensures that the re-application of braking pressure up to the knee point is especially rapid.

In a modification in which some air is supplied to the application chamber during re-application, the re-application of braking pressure upto the knee point will be less rapid, but will still be quicker than units of known type in which the application chamber is discharged completely during the skid cycle. The rate of re-application of the brake following correction of a skid may be determined by the relative volumes of the memory chamber and the application chamber, and the characteristics of a flow-control regulator valve which controls the rate at which pressure in the memory chamber can leak to atmosphere.

Normally the control pressure acts on one face of a main piston to operate the main valve assembly and the application chamber is isolated from the memory chamber by a valve operable by the means responsive to the skid signal, one wall of the memory chamber being defined by a face of a second piston, which face is arranged in opposition to the said one face of the main piston, with the two pistons being coupled together.

The pistons may be coupled together against relative axial movement, or they may be coupled together by means of a lost-motion connection.

When the pistons are coupled together against relative axial movement the main valve assembly is held in a normally open position by means of a spring to overcome the friction in seals but when a lost-motion connection is provided between the two pistons such a spring is unnecessary since the main piston is able to move without incurring friction losses from the second piston.

The memory chamber may be defined by a control chamber between the said face of the second piston and the wall of the bore in which it works or the memory chamber may comprise the total volume of the control chamber and a separate reservoir chamber which is normally in communication with the control chamber but which is isolated from it whilst a skid is being corrected.

When separate skid control units are provided for the wheels at opposite ends of an axle, particularly a steerable axle, according to another aspect of our invention, the memory chambers of the two units are interconnected by a pneumatic connection incorporating a restrictor.

This has the advantage that when the wheels are travelling over surfaces of different coefficients of friction ($\mu$) and the wheel travelling over the surface of lower $\mu$ skids, then air from the memory chamber of that unit passes through the connection and the restrictor into the memory chamber of the unit for the non-skidding wheel travelling over the surface of higher $\mu$. This reduces the nett control force on the unit for the higher $\mu$ wheel so that braking pressure and hence braking torque are reduced, in turn ensuring that the driver of the vehicle does not feel an adverse pull at the steering wheel.

Thus we are able to control the torque differential between braked wheels on a common axle, particularly, a steerable axle.

Preferably the control chambers which constitute, or form part of, the memory chambers are interconnected by the connection.

Some embodiments of our invention are illustrated in the accompanying drawings in which:

FIG. 1 is a layout of a pneumatically-operated anti-skid braking system including a section through a skid control unit;

FIG. 4 is a modified flow-control regulator valve for the skid control unit embodied in the braking system of FIG. 1;

Figure 2:
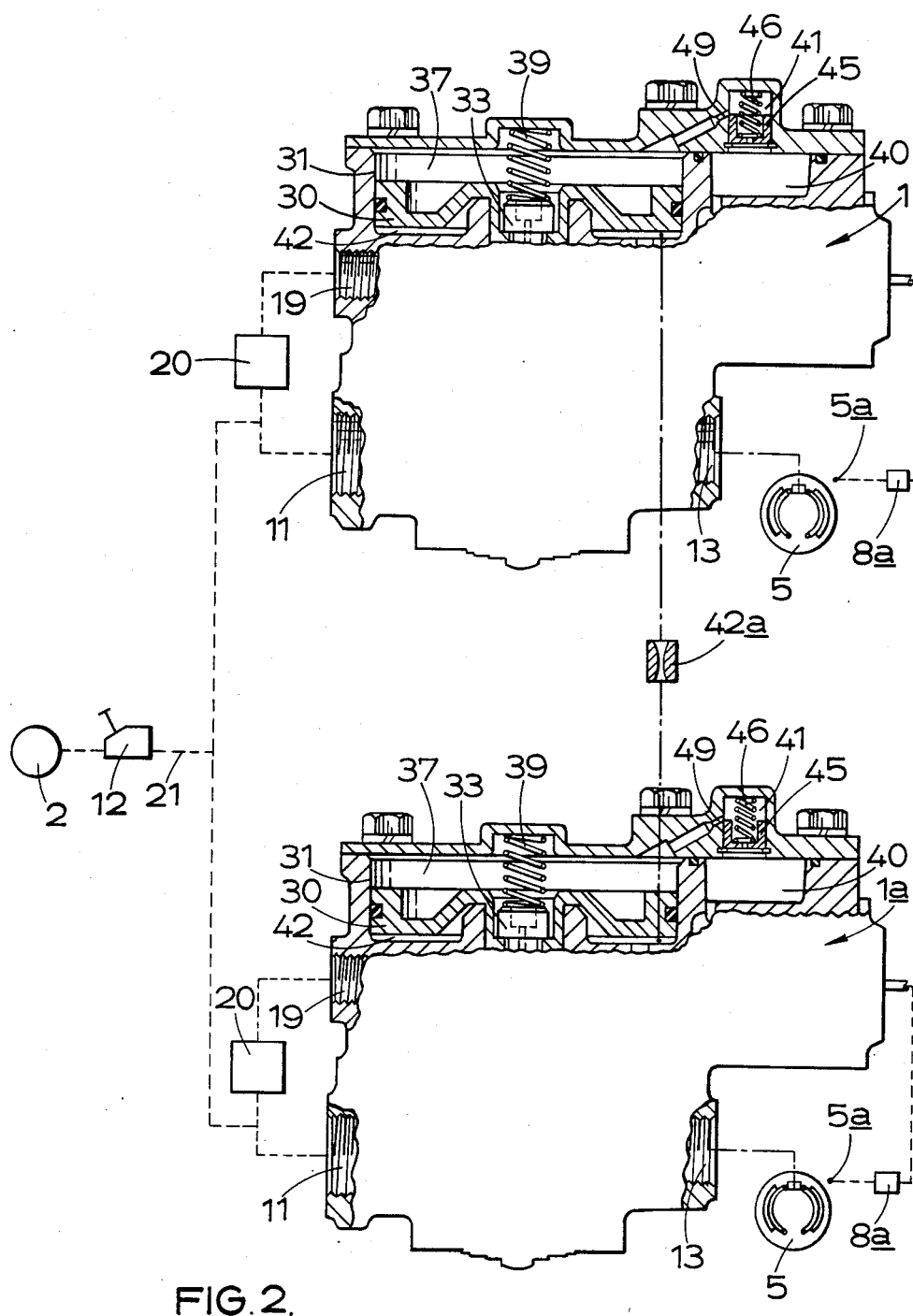
FIG. 2 is a layout of another braking system.

In the pneumatically-operated anti-skid braking system illustrated in FIG. 1 of the accompanying drawings a skid control unit 1 is adapted to regulate the supply of pneumatic fluid from a source 2 to an actuator 3 of a brake 4 in accordance with the behaviour of the wheel 5 braked by the brake 4.

As illustrated the unit 1 comprises a housing 6 incorporating fluid-flow control means 7, and a solenoid-operated valve 8.

The fluid-flow control means 7 comprises a relay valve 10 for controlling communication between an inlet supply passage 11, which is connected to a treadle valve 12 for controlling the supply of pressure from the source 2, and an outlet supply passage 13 which is connected to the actuator 3 of the brake 4.

The relay valve 10 comprises a bore 14 of stepped outline in which works a piston 15 of complementary outline. An application chamber 16 defined in the bore 14 between shoulders 17 and 18 at the respective steps in diameter is connected to the treadle valve 12 through a branch-line 19 and a one-way valve 20 is located in the branch line 19, on the downstream side of its connection to a line 21, between the treadle valve 12 and the passage 11. A valve head 22 on the face of the piston 15 which is opposite the chamber 16 is engageable with a valve head 23 comprising a radial flange at the inner end of a sleeve 24, and the sleeve 24 is guided in an inwardly projecting axial skirt 25 of a closure member 26 for the lower end of the housing 6. The head 23 is also engageable with a seating 27 on the housing and the seating 27 is interposed between the inlet and outlet supply passages 11 and 13 through a chamber 28 between itself and the end of greater area at the lower end of the piston 15. A compression spring 29 acts to urge the head 23 towards the head 22.

The end of the piston 15 which is of smaller area is coupled to a corresponding, smaller area end, of a second piston 30 of differential outline. The piston 30 works in a second stepped bore 31 in the housing above the bore 14 and of which the portion of smaller area is common to the smaller area portion of the bore 14. A bolt 32 provides a rigid coupling between the two pistons 15 and 30, with mating faces of the pistons clamped together between the head 33 and a nut 34. The stem 35 projects through clearance bores in the pistons 15 and 30, and the bolt 32 itself is provided with a through bore 36. This ensures that an atmospheric chamber 37 above the piston 30 is in communication at all times with atmosphere through the sleeve 24 and an exhaust port 38 in the closure 26. A compression spring 39 acts on the head 33 of the bolt 35 to urge both pistons 30 and 15 towards the closure 26 with the head 22 in sealing engagement with the head 23, in turn to hold the head away from the seating 27. Thus the inlet supply passage 11 is normally in open communication with the outlet passage 13.

A reservoir chamber 40, which is normally at atmospheric pressure, communicates through a flow-control regulator valve 41 with the atmospheric chamber 37, and a control chamber 42 defined in the bore 31 between shoulders 43 and 44 at the respective steps in diameter of the bore 31 and the piston 30 communicates with the reservoir chamber 40 through the solenoid-operated valve 8.

The flow-control valve 41 comprises a spool 45 which is urged by a spring 46 against a stop 47 and is provided with an orifice 48, and the spool 45 is axially movable in a bore to control the effective size of a passage 49 leading to the atmospheric chamber 37, thereby to constitute a variable orifice.

As illustrated the solenoid-operated valve 8 comprises a coil 50 which is adapted to be energised in response to a current from an electronic control module 8a which, in turn, is dependent upon a skid signal from skid sensing means 5a responsive to the behaviour of the wheel 5. A core-piece 51 is movable axially in response to energisation of the coil 50, and the core-piece 51 carries a valve head 52 for alternate engagement with one of a pair of spaced valve seatings 53 and 54.

In the inoperative position shown in which the coil 50 is de-energised, the head 52 engages with the seating 53 so that the application chamber 16 is isolated from the control chamber 42, and the control chamber 42 is in communication with the reservoir chamber 40 through the valve seat 54. This is achieved by a force applied to the core-piece 51 by a spring 55. In this position, as described above, the head 22 seals against the head 23 and holds the head 23 away from the seating 27 to place the passages 11 and 13 in open communication. The actuator 3 is exhausted to atmosphere through an exhaust port 56 on the treadle valve 12, through which the application chamber is also exhausted through a bleed orifice 57 in the valve member 58 of the one-way valve 20.

When the brake 5 is to be applied the treadle valve 12 is operated to supply air under pressure straight to the actuator 3 through the passages 11 and 13. Simultaneously air under the same pressure is supplied to the application chamber 16 from the treadle valve 12 and through the one-way valve 20. Since the areas of opposite sides of the larger diameter portion of the piston 15 are substantially equal the forces on the piston 15 normally balance.

Should a skid signal be received, the coil 50 is energised to urge the core-piece 51 in a direction to urge the head 52 away from the seating 53 and into engagement with the seating 54. This places the application chamber 16 in communication with the control chamber 42, thereby destroying the force due to pressure in the chamber 16 acting over the area of the face 18, since the same pressure is applied to the face 44. The pressure acting on the opposite lower side of the piston 15 urges the piston 15 relatively away from the closure 26, carrying the upper piston 30 with it. Initial movement of the piston 15 in this direction is accompanied by a corresponding movement of the sleeve 24 until that movement of the head 23 is arrested by engagement with the seating 27 to isolate the brake actuator 3 from the inlet supply passage 11, further movement of the piston 15 in the same direction urging the head 22 away from the head 23 to place the outlet supply passage 13 in communication with atmosphere through the exhaust port 38, whereby to relieve pressure applied to the brake 5.

When the skid signal is cancelled, the head 53 is urged by the spring 55, out of engagement with the seating 54 and into engagement with the seating 53. This isolates the application chamber 16 from the control chamber 42, and connects the control chamber 42 to the reservoir chamber 40 which, in this mode, together constitute a memory chamber. The air from the control chamber 42, which is at a higher pressure, flows into the reservoir chamber 40, which is at atmospheric pressure, and then leaks to the atmospheric chamber 37 through the flow-control regulator valve 41. The pressure in the memory chamber (40+42) is thereby reduced at a controlled rate. This permits the control pressure in the application chamber 16 to apply a force to the piston 15, in a direction to urge the piston 15 towards the closure 26, with the result that the head 22 reengages with the head 23 initially to isolate the outlet passage 13 from the exhaust port 38 and, subsequently, to urge the head 23 away from a seating 27 thereby reconnecting the inlet supply passage 11 to the outlet supply passage 13 so that the brake 4 is re-applied.

The extent to which the piston 15 urges the head 22 away from the seating 27 with consequent increase in the pressure applied to the brake depends upon the rate at which the flow-control regulator valve 41 permits fluid in the memory chamber (40+42) to be displaced to atmosphere through the atmospheric chamber 37 and the exhaust port 38.

Assume the brake is applied with a pressure of 60 p.s.i. (4.14 bar) and that this causes a skid signal to occur.

| Mode of Operation | Application Chamber (16) | | Brake Pressure | | Control Chamber (42) | | Reservoir Chamber (40) | |
|---|---|---|---|---|---|---|---|---|
| | p.s.i. | bar | p.s.i. | bar | p.s.i. | bar | p.s.i. | bar |
| Initial application | 20(80) | 1.38(5.52) | 20 | 1.38 | 0 | 0 | 0 | 0 |
| Skid signal | 80 | 5.52 | 0 | 0 | 80 | 5.52 | 0 | 0 |
| Skid cancel | 80 | 5.52 | 20(40) | 1.38(2.76) | 40 | 2.76 | 40 | 2.76 |
| Skid signal | 80 | 5.52 | 0 | 0 | 80 | 5.52 | 40 | 2.76 |
| Skid cancel | 80 | 5.52 | 20 | 1.38 | 60 | 4.14 | 50 | 3.45 |
| Skid signal | 80 | 5.52 | 0 | 0 | 80 | 5.52 | 60 | 4.14 |
| Skid cancel | 80 | 5.52 | 10 | 0.69 | 70 | 4.83 | 70 | 4.83 |
| Slow | 80 | 5.52 | 15 | 1.03 | 65 | 4.48 | 65 | 4.48 |
| re-apply | 80 | 5.52 | 20 | 1.38 | 60 | 4.14 | 60 | 4.14 |

In the example referred to above the figures in brackets refer to steady state pressures which would have been reached had a skid signal not have been issued.

In the system described above, preferably the piston 30 has a larger effective area than that of the piston 15 in order to provide sufficient force to overcome the friction of the seals carried by the pistons 15 and 30 and the force in the spring 39 when a skid is to be corrected.

Although the system described with reference to FIG. 1 states that the unit 1 is interposed between a treadle valve 12 and a brake, the unit itself may comprise an "in-line" unit in that it can be added to an existing braking system with a minimum of change. In such an arrangement the unit 1 can be interposed in a line between an existing relay valve and the brake, or between a treadle valve and an existing relay valve.

Similarly two units 1, 1a can be installed in a system to control the difference in brake torque applied to wheels 5 of pairs on opposite sides of a vehicle, generally referred to in the field of Automobile Engineering as wheels on opposite ends of an axle. This is achieved, in layouts illustrated in FIGS. 2 and 3 in which separate units 1 are provided for the brakes of the wheels at opposite ends of an axle.

In the system of FIG. 2 control chambers 42 of the two units 1 are interconnected through a restrictor 42a.

When the brakes are applied with the wheels at opposite ends of the axle running on surfaces of different μ, the wheel on the surface of lower μ will skid and the

| Mode of Operation | Application Chamber (16) | | Brake Pressure | | Control Chamber (42) | | Reservoir Chamber (40) | |
|---|---|---|---|---|---|---|---|---|
| | p.s.i. | bar | p.s.i. | bar | p.s.i. | bar | p.s.i. | bar |
| Normal | 60 | 4.14 | 60 | 4.14 | 0 | 0 | 0 | 0 |
| Skid signal | 60 | 4.14 | 0 | 0 | 60 | 4.14 | 0 | 0 |
| Skid cancelled | 60 | 4.14 | 30 | 2.07 | 30 | 2.07 | 30 | 2.07 |
| Slow re-apply | 60 | 4.14 | 40 | 2.76 | 20 | 1.38 | 20 | 1.38 |
| | 60 | 4.14 | 50 | 3.45 | 10 | 0.69 | 10 | 0.69 |
| | 60 | 4.14 | 60 | 4.14 | 0 | 0 | 0 | 0 |

As can be seen the brake pressure is re-applied rapidly initially to a lower level and then slowly to the original level. If the volume of the reservoir chamber 40 is then relatively large in comparison with that of the control chamber the brake 4 will be re-applied rapidly to a higher level and, if relatively small, to a lower level.

If the vehicle is on a low friction surface but the applied pressure is high the valve 10 will operate to charge the reservoir chamber 40 to a higher level.

In another example, assume that the control pressure can attain a maximum value of 80 p.s.i. (5.52 bar), and that a skid will occur when the brake pressure is 20 p.s.i. (1.38 bar).

unit 1 associated with that wheel, hereinafter referred to as the "skid unit", will operate as described above. When the two control chambers 42 are interconnected through the restrictor 42a, air entering the control chamber 42 of the skid unit 1 from the application chamber 16 of that unit will pass through the restrictor to the control chamber 42 of the other unit 1a, hereinafter referred to as the "non-skid unit", and thus into the total memory chamber (40+42) of non-skid unit 1a, namely the volume of the control chamber 42 plus the volume of the reservoir chamber 40. This acts on the respective piston 30 to urge it and the piston 15 relatively away from the closure member 26 and tends to close the relay valve 10, thereby reducing the pressure applied to the brake of the wheel which is running on the surface of higher μ. This reduces the brake torque on that wheel.

Such action may be sufficient to prevent the higher μ wheel skidding at all, but if it does tend to skid, then the effect of the cross-axle interconnection will be to lower the knee point for the higher μ wheel during brake re-application following correction of the skid since the reservoir chamber 40 of the non-skid unit 1a will have been pre-charged to some extent. Any tendency for the characteristics of the skid unit 1 to be affected in the opposite sense will be minimal because of the restrictor 42a and because the control chamber 42 of the skid unit 1 is replenished from the supply 2, for example the treadle valve or other relay valve, during every skid cycle.

We are therefore able to control the torque differential by arranging for the memory chamber (40+42) normally to be isolated from the supply and to act in opposition to the pressure in the application chamber 16 which provides us with the ability to alter the gain of the relay valve 10. This is particularly useful on a steerable axle with a positive offset steering geometry.

The operation of the two units 1 is otherwise the same as described above with reference to FIG. 1 and, where appropriate, corresponding reference numerals have been applied to corresponding parts.

Figure 3:
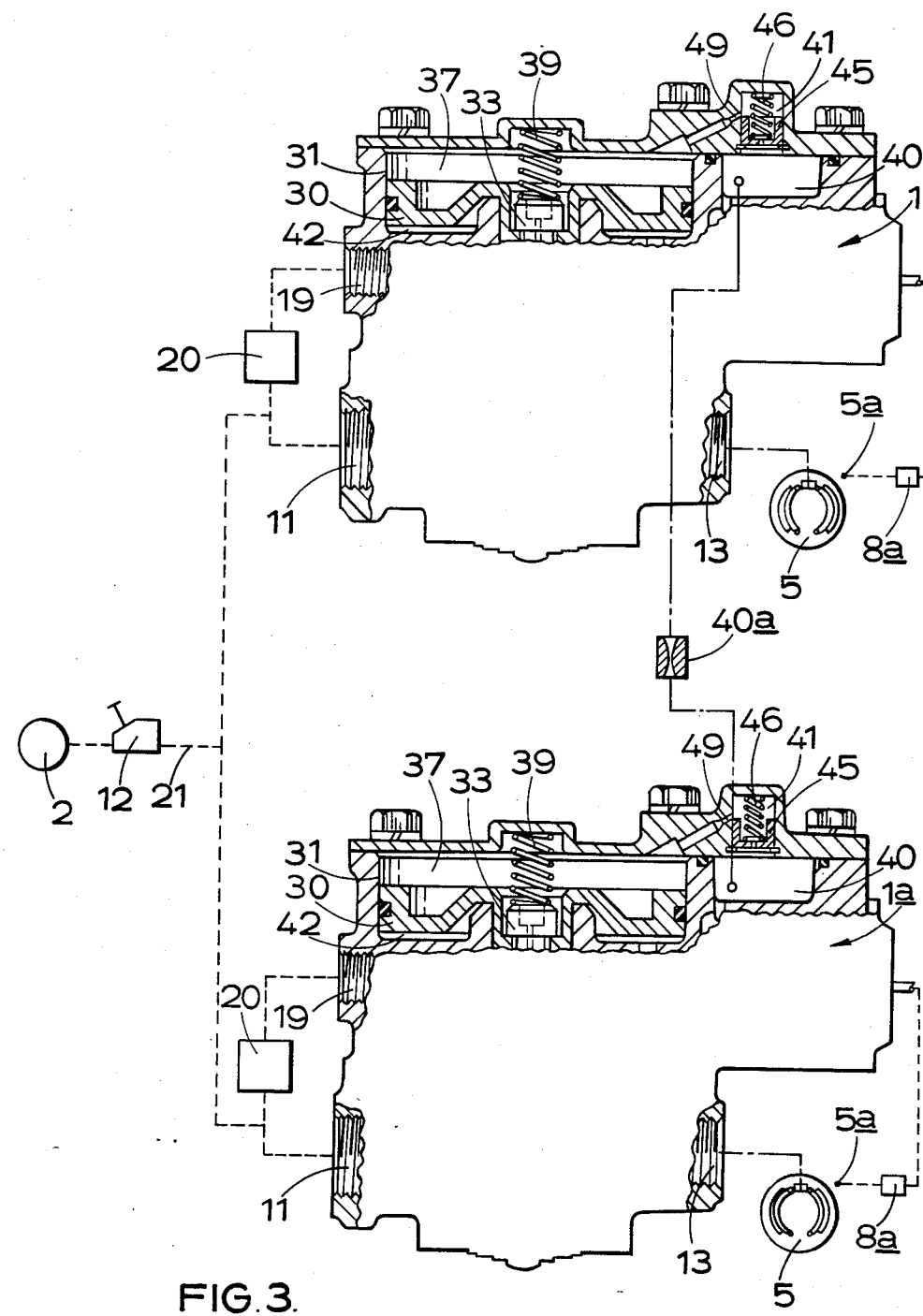
FIG. 3 is a layout of a braking system similar to FIG. 2 but showing a modification.

In the system of FIG. 3 the two reservoir chambers 40 are interconnected through a restrictor 40a. In this system a similar effect is achieved to that of the system of FIG. 2. However the effect is delayed since the reservoir chamber 40 of the skid unit 1 is pressurised only when the associated skid signal is cancelled. Thus, when the ground offset is large, it would preferably be necessary to control the two units 1, 1a synchronously for the first two or three cycles.

The construction and operation of the system of FIG. 3 is otherwise the same as FIG. 2 and corresponding reference numerals have been applied to corresponding parts.

In the modification shown in FIG. 4 of the drawings a hollow piston 60 working in a bore 61 in the housing 6 is exposed on its upper face to pressure in the reservoir chamber 40 and on its opposite, lower, face to pressure in the control chamber 40. In addition, the piston 60 carries a piston-rod 62 which extends towards the spool 45 of the flow-control regulator valve 41, and a spring 63 urges the piston 60 relatively away from the flow-control valve 41.

Normally the piston 60 is spring-urged away from the flow-control valve 41 when the brake 5 is applied normally with the chambers 42 and 40 in open communication and the coil 50 is de-energised.

When the coil 50 is energised in response to a skid signal the control chamber 42 is isolated from the reservoir chamber 40. The piston 60 is then subjected to a pressure differential which urges it against the loading in the spring 63 in a direction to close the flow control valve 41 by the piston-rod 62 acting to urge the spool 45 axially in its bore to close the orifice 49. This isolates the reservoir chamber 40 from the atmospheric chamber 37 to prevent leakage from the reservoir chamber 40 during brake release periods. This prevents any tendency for the knee point to creep upwards during operation on low μ surfaces when brake release periods are correspondingly longer.

Although the piston 60 is responsive to the pressure difference between the control chamber 42 and reservoir chamber 40 which exists when the coil 50 is energised, in a modification the piston 60 can be responsive to the movement of the core-piece 51 itself.

Figure 5:
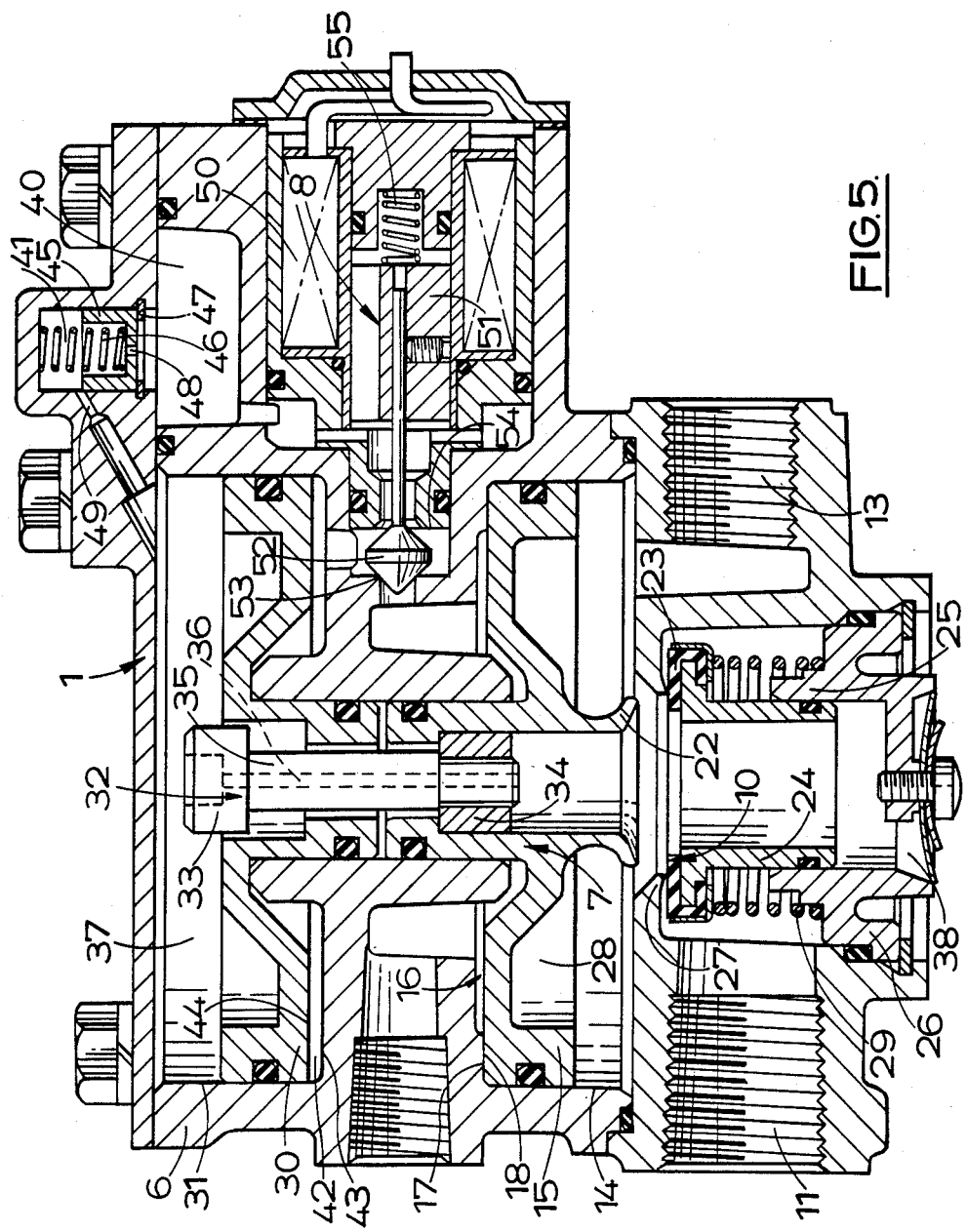
FIG. 5 is a section through a modified skid control unit.

The unit illustrated in FIG. 5 of the accompanying drawings is particularly suitable for controlling operation of a pair of brakes on the wheels on opposite ends of an axle. In the unit of FIG. 5 the spring 39 is omitted and a lost-motion connection is provided between the two pistons 15 and 30. This is achieved by reducing the length of the portion of the piston 30 which is of reduced diameter so that the piston 30 can move relative to the bolt 35.

When the treadle valve 12 is operated the piston 15 moves towards the closure 26 independently of the upper piston 30 in order to apply the brakes.

If a skid signal is received the coil 50 is energised, and the head 52 engages with the seating 54 to isolate the reservoir chamber 40 from the control chamber 42, and place the application chamber 16 in communication with the control chamber 42. This action removes the pressure applied to the brake 4, so that the skid signal is cancelled. The brake 5 is then re-applied rapidly to a lower level, and then slowly to the original level.

In the unit of FIG. 5 the pressure in the application chamber 16 remains constant and does not have to be re-applied, other than to make up the expanding volume of the control chamber 42 due to the relative movement between the pistons 15 and 30, and this will give a rapid re-apply signal.

The construction and operation of the unit of FIG. 5 is otherwise the same as that illustrated in FIG. 1, and corresponding reference numerals have been applied to corresponding parts.

Figure 6:
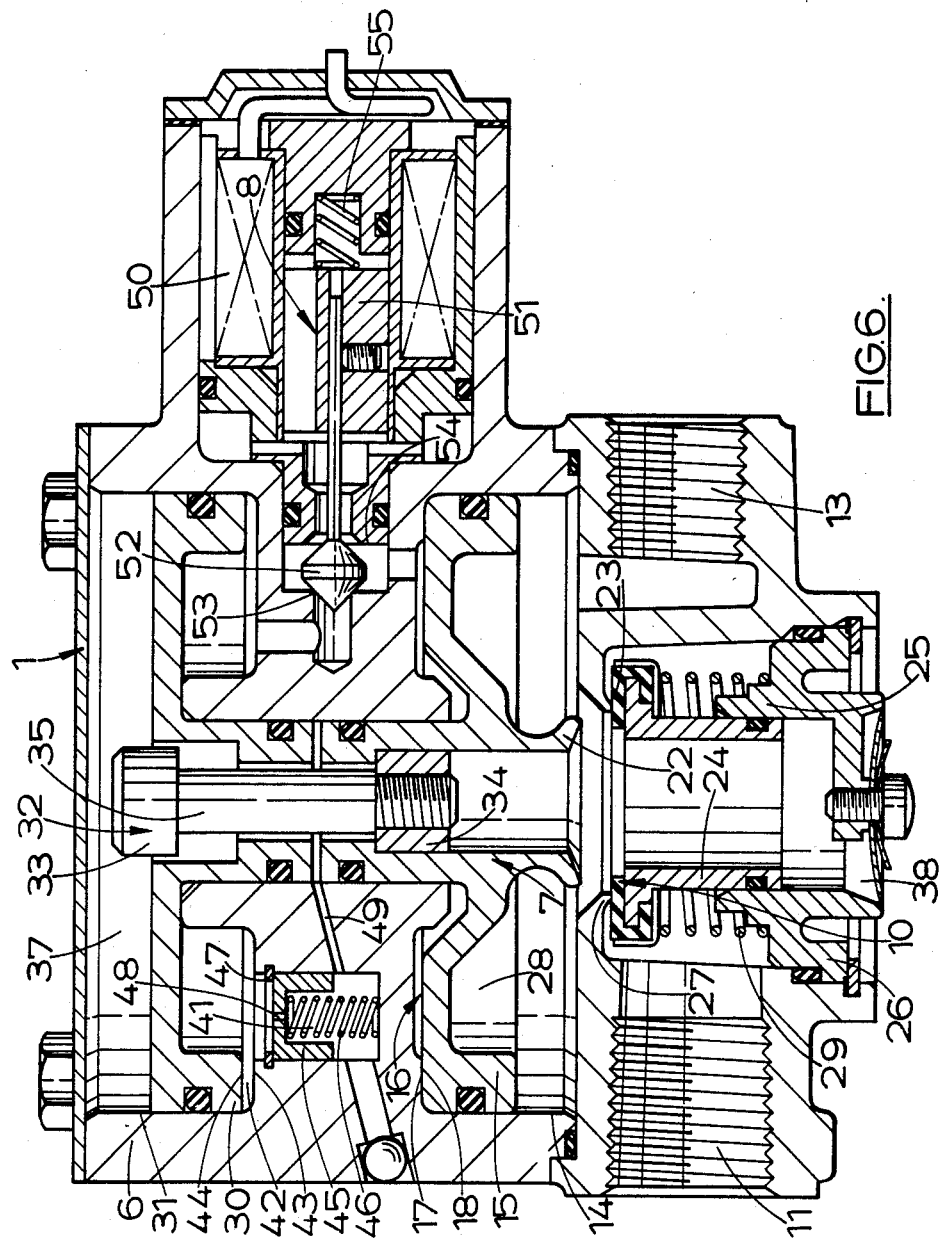
FIG. 6 is a section through another skid control unit.

The reservoir chamber 40 is omitted from the unit illustrated in FIG. 6 of the drawings, the control chamber 42, which constitutes the memory chamber, communicates with atmosphere through the flow-regulating control valve 41, and the control pressure is applied to the application chamber 16 through the solenoid-operated valve 8.

When a skid signal is received, the supply to the application chamber 16 is cut-off and the application chamber 16 is connected to the control chamber 42 thus cancelling the force applied to the relay valve 10 in an opening direction. Since the volume of the control chamber 42 is relatively large, the pressure level in the application chamber 16 falls rapidly.

When the skid is cancelled the control pressure is re-applied to the application chamber 16 but since trapped pressure still exists in the control chamber 42, the brake is only partially re-applied. As the air escapes from the control chamber 42 under the control of the flow-control regulator valve 41 the brake is gradually re-applied to a higher level.

The construction and operation of the unit of FIG. 6 is otherwise the same as that of FIG. 5 and corresponding reference numerals have been applied to corresponding parts.

The unit of FIG. 6 is suitable for use only as a relay valve such as is described in the layout of FIG. 1.

The unit of FIG. 6 is not suitable for application in an "in line" unit. If adapted for use in this way the relay valve 10 would oscillate violently on re-application after a skid signal since the input pressure would fall when the relay valve 10 opens with the result that the downward force on the piston 15 would be difficult to establish.

We claim:

1. A fluid-pressure operated braking system for vehicles comprising a wheel brake, a supply of operating fluid for applying said brake, a line between said supply and said brake, a skid control unit disposed in said line between said supply and said brake, said skid control unit incorporating valve means for relieving pressure of fluid supplied to said brake at a skid point, means responsive to a skid signal for operating said valve means, said skid control unit also incorporating a memory chamber means controlled responsive to a skid signal for storing a memory pressure dependent upon said pressure of said fluid applied to said brake at said skid point, means which is held operated for the duration of said skid signal for maintaining a pressure in the memory chamber which was fixed at the pressure which was prevailing when the skid signal occurs, and means responsive to an end of a skid signal for enabling said pressure in said memory chamber to decay at a controlled rate to control the rate of re-application of said brake following correction of said skid, said memory chamber being charged with air only when said skid signal is received.

2. A system as claimed in claim 1, wherein said skid control unit incorporates an application chamber, and a main valve assembly for controlling the supply of fluid from said supply to said brake, said application chamber being responsive to a control pressure to generate a control force to operate said main valve assembly, in turn to control said supply to said brake, and said memory chamber acts in opposition to said application chamber in order to reduce said control force and determine the position of a knee point between first and second stages of brake re-application following correction of a skid.

3. A system as claimed in claim 2, wherein full pressure of said control pressure is retained in said application chamber throughout the skid cycle.

4. A system as claimed in claim 2, wherein some air is supplied to said application chamber during brake re-application following correction of a skid.

5. A system as claimed in claim 1, wherein said skid control unit incorporates an application chamber, and a main valve for controlling the supply of fluid from said supply to said brake, said application chamber being responsive to a control pressure to generate a control force to operate said main valve assembly, and said skid control unit includes a flow-control regulator valve which controls the rate at which pressure in said memory chamber can leak to atmosphere, the rate of re-application of the brake following correction of a skid being determined by the relative volumes of said memory chamber and said application chamber, and the characteristics of said flow-control regulator valve.

6. A fluid-pressure operated braking system, for vehicles comprising a wheel brake, a supply of operating fluid for applying said brake, a line between said supply and said brake, a skid control unit disposed in said line between said supply and said brake, said skid control unit incorporating valve means for relieving pressure of fluid supplied to said brake at a skid point, and means responsive to a skid signal for operating said valve means, wherein said skid control unit also incorporates a memory chamber for controlling the rate of re-application of said brake following correction of said skid, and said memory chamber is charged with air only when a skid signal is received, and wherein said skid control unit incorporates an application chamber, a main valve assembly for controlling the supply of fluid from said supply to said brake, said application chamber being responsive to a control pressure to generate a force to operate said valve assembly, a main piston for operating said main valve assembly and having a pressure-responsive face responsive to said control pressure to operate said main valve assembly, a second piston having a pressure-responsive face arranged in opposition to said pressure-responsive face of said main piston and defining a wall of said memory chamber, coupling means coupling said main piston and said second piston together, and a valve operable by said means responsive to said skid signal, said valve being movable between a first position to isolate said memory chamber from said application chamber when no skid signal is present and a second position to place said memory chamber in communication with said application chamber when a skid signal is present.

7. A system as claimed in claim 6, wherein said coupling means couples said pistons together against relative axial movement.

8. A system as claimed in claim 6, wherein said coupling means includes a lost-motion connection through which said pistons are coupled together.

9. A system as claimed in claim 6, wherein a spring is provided to hold said main valve assembly in a normally open position in which said supply is in communication with said brake.

10. A system as claimed in claim 6 wherein said memory chamber is defined by a control chamber disposed between the said pressure-responsive face of said second piston and the wall of a bore in which said second piston works.

11. A system as claimed in claim 6, wherein said memory chamber comprises the total volume of a control chamber disposed between the said face of said second piston and the wall of a bore in which said pressure-responsive second piston works, and an separate reservoir chamber, said reservoir chamber normally being in communication with said control chamber but being isolated from said control chamber whilst a skid is being corrected.

12. A fluid-pressure operated braking system for vehicles comprising first and second brakes on respective first and second wheels on opposite ends of an axle, a supply of operating fluid for actuating both said first and second brakes, a first line between said supply and said first brake, a second line between said supply and said second brake, a first skid control unit in said first line between said supply and said first brake, a second skid control unit in said second line between said supply and said second brake, first means associated with said first control unit and responsive to a skid signal from said first wheel, first valve means responsive to said first means to relieve the pressure of fluid supplied to said first brake at a skid point, second means associated with said second control unit and responsive to a skid signal from said second wheel, second valve means responsive to said second means to relieve the pressure of fluid supplied to said second brake at a skid point, said first control unit incorporating a first memory chamber for controlling the rate of re-application of said first brake following correction of said skid, and said first memory chamber being charged with air only when a skid signal is recieved, said second control unit incorporating a second memory chamber for controlling the rate of re-application of said second brake following correction of said skid, and said second memory chamber being charged with air only when a skid signal is received, wherein a pneumatic connection incorporating a restrictor interconnects said first and second memory chambers.

13. A system as claimed in claim 12, wherein each said first and second control units comprises a housing incorporating an application chamber, a main valve assembly for controlling the supply of fluid from said supply to said first and second respective brakes, said application chamber being responsive to a control pressure to generate a force to operate said valve assembly, a main piston for operating said main valve assembly and having a pressure-responsive face responsive to said control pressure to operate said main valve assembly, a second piston having a pressure-responsive face arranged in opposition to said pressure-responsive face of said main piston and defining a wall of said memory chamber, coupling means coupling said first and second pistons together, and a valve operable by said means responsive to said skid signal, said valve being movable between a first position to isolate said memory chamber from said application chamber when no skid signal is present and a second position to place said memory chamber in communication with said application chamber when no skid signal is present.

14. A system as claimed in claim 13, wherein said second piston works in a bore in said housing, and each said memory chamber is defined by a control chamber disposed between the said pressure-responsive face of said second piston and the wall of said bore in which it works, and said control chambers of said first and second units are interconnected by said pneumatic connection.

15. A system as claimed in claim 13, wherein said second piston works in a bore in said housing, and each said memory chamber comprises the total volume of a control chamber disposed between the said pressure-responsive face of said second piston and the wall of said bore in which it works, and a separate reservoir chamber which is normally in communication with said control chamber but which is isolated from it whilst a skid is being corrected, said reservoir chambers of said first and second units being interconnected by said pneumatic connection.

* * * * *